United States Patent
Chong et al.

(10) Patent No.: US 6,859,808 B1
(45) Date of Patent: Feb. 22, 2005

(54) MAPPING LOGICAL ROW IDENTIFIERS FOR PRIMARY B+TREE-LIKE STRUCTURES TO PHYSICAL ROW IDENTIFIERS

(75) Inventors: Eugene I. Chong, Concord, MA (US); Jagannathan Srinivasan, Nashua, NH (US); Souripriya Das, Nashua, NH (US); Charles G. Freiwald, Amherst, NH (US); Aravind Yalamanchi, Nashua, NH (US); Mahesh Jagannath, Burlington, MA (US); Anh-Tuan Tran, Vacaville, CA (US); Ramkumar Krishnan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 09/867,678

(22) Filed: May 31, 2001

(51) Int. Cl.[7] .............................................. G06F 17/30
(52) U.S. Cl. ......................... 707/101; 707/102; 707/3
(58) Field of Search .................................. 707/100, 101, 707/102, 3–10, 201

(56) References Cited

U.S. PATENT DOCUMENTS

| | | | | |
|---|---|---|---|---|
| 5,204,958 | A | * | 4/1993 | Cheng et al. ............... 707/102 |
| 5,363,098 | A | | 11/1994 | Antoshenkov |
| 5,682,535 | A | * | 10/1997 | Knudsen ..................... 717/117 |
| 5,852,822 | A | | 12/1998 | Srinivasan et al. |
| 5,893,104 | A | | 4/1999 | Srinivasan et al. |
| 5,915,249 | A | * | 6/1999 | Spencer ......................... 707/5 |
| 6,141,773 | A | * | 10/2000 | St. Pierre et al. ............ 714/20 |
| 6,219,662 | B1 | * | 4/2001 | Fuh et al. ....................... 707/3 |
| 6,266,660 | B1 | * | 7/2001 | Liu et al. ....................... 707/3 |
| 6,349,308 | B1 | * | 2/2002 | Whang et al. .......... 707/103 Z |
| 6,546,394 | B1 | * | 4/2003 | Chong et al. ................ 707/100 |
| 6,591,269 | B1 | * | 7/2003 | Ponnekanti .................. 707/100 |
| 6,631,366 | B1 | * | 10/2003 | Nagavamsi et al. ............ 707/3 |
| 2002/0059281 | A1 | * | 5/2002 | Watanabe et al. ............ 707/100 |

OTHER PUBLICATIONS

Chong et al., "B+-Tree Indexes with Hybrid Row Identifiers in Oracle8i", Proceeding of the 17th International Conference on Data Engineering, Apr. 2, 2001, pp. 341–348.*

Zou et al., "On-line Reorganization of Sparsely–populated B+ Tree", Proceedings of the 1996 ACM SIGMOND Jun. 1996, pp. 115–124.*

Lanka et al., "Fully Persistent B+ Trees", Proceedings of the 1991 ACM SIGMOND, 1991, pp. 426–435.□□.*

Comer, Douglas, "Ubiquitous B–Tree", ACM Computing Survey vol. 11, issue 2, Jun. 1979, pp. 121–137.*

Spatial Quadtree Indexing, Oracle Spatial User's Guide and Reference for Oracle Release 8.1.6, Dec. 1999.

* cited by examiner

*Primary Examiner*—Srirama Channavajjala
(74) *Attorney, Agent, or Firm*—Swidler Berlin LLP

(57) ABSTRACT

A mapping mechanism for a primary B+tree in a database management system. The primary B+tree includes a plurality of rows. The mapping mechanism includes introducing a mapping table that includes a plurality of rows, including a row for each row of the primary B+tree, and that stores the logical identifier of the corresponding primary B+tree row. In addition, reverse mapping is provided by augmenting a primary B+tree to include in each primary B+tree row a physical row identifier of the corresponding mapping table row. An auxiliary structure created on a primary B+tree can make use of the proposed mapping mechanism. Specifically, the auxiliary structures refers to primary B+tree rows indirectly by storing the physical row identifier of the corresponding mapping table row.

16 Claims, 3 Drawing Sheets

MAPPING LOGICAL ROW IDENTIFIERS FOR PRIMARY B+TREE-LIKE STRUCTURES TO PHYSICAL ROW IDENTIFIERS

FIELD OF THE INVENTION

The present invention relates to organizing and accessing database indices/auxiliary structures. In particular, the present invention relates to a secondary index/auxiliary structure for indexing a primary B+tree. More particularly, the present invention relates to providing a mapping of logical row identifiers of primary B+tree to physical row identifiers, which are suitable for use in a secondary index/auxiliary structure.

BACKGROUND OF THE INVENTION

In a typical relational database system, users store, update, and retrieve information by interacting with user applications. The applications respond to a user's interaction by submitting commands to a database application, or server, responsible for maintaining the database. The database server responds to commands by performing the specified actions on the database. To be correctly processed, the commands must comply with the database language that the database server supports. One popular database language is commonly known as Structured Query Language (SQL).

Various access methods may be utilized to retrieve data from a database. The access methods used to retrieve data may significantly affect the speed of the retrieval and the amount of resources consumed during the retrieval process. Many information retrieval applications make use of indices when performing content-based searches on the database data. A few examples of database indices include R-trees, quadtrees, and B-trees.

Database indices provide organization and reference to the data in a database to permit a user to find particular items of data in the database or determine relationships among the data in the database. Database indices can also permit relationships between the data in a database and data not included in the database to be determined. For example, a database index can make it possible to determine location within a certain distance of a location defined in a database comprised of geographical location information.

If data is stored in a heap-organized table, then a B-tree index can be created. The index is typically built on the columns of the table, each index entry in the index having the form <$column_{13}$ value, rowid>, where "rowid" uniquely identifies the row within the table that corresponds to the index entry.

Many applications involve data sets in which individual rows are identified by a primary key. The primary key uniquely identifies each row within the table and may be formed from a single column, such as social security number for an employee, or may be formed from multiple columns, such as an area code plus a seven digit local phone number. For such a table, a primary key index can be utilized. Entries within a primary key index may have the form <primary key value(s), rowid>. A primary key index provides good query performance when only indexed columns are referenced in the query, so-called index-only scans. If non-indexed columns are referenced, an indexbased scan may be utilized. In an index-based scan, the primary key index structure may be traversed to obtain a rowid, which may be then used to access the rows within the table structure.

To avoid duplication of the primary key values as well as to speed up primary key-based retrieval efforts, a primary B+tree like structure has been introduced. The primary B+tree like structure may include not only the indexed column values, but also all the remaining column values of the table in the leaves of the index structure. Thus, the primary B+tree like structure can render maintenance of a separate table unnecessary.

Therefore, each row may include both key and non-key columns. The non-key columns may be stored along with the key columns. As a result, primary B+trees do not incur additional input/output overhead to access the non-key columns as with a conventional table's index-based scan.

As with a conventional heap-organized table/index pair, a primary B+tree provides good query performance for data included in the column or columns forming the primary key. To aid in the retrieval efforts of queries based upon non-primary key columns, secondary index structures may be provided. Entries within the secondary structure may have the form <secondary key value, primary key value>. For index-only scans, data may be extracted directly from the secondary index structure. For index-based scans, the secondary index structure may first be traversed to obtain the corresponding primary key value, which may then be utilized in a primary key index scan of the primary B+tree to obtain values from other columns that are of interest.

SUMMARY OF THE INVENTION

A physical row identifier stored/maintained in an auxiliary structure such as a B+tree or bitmap index represents the physical address of a row in the base table. A bitmap index may be created as described in greater detail in a U.S. patent application filed on even date herewith for "Supporting Bitmap Indexes on Primary B+tree Structures", to Chong et al., filed May 29, 2001, having application Ser. No. 09/865,599, now pending, the entire contents of the disclosure of which is hereby incorporated by reference. The storage for the base table may be heap-organized. Alternatively, the storage for the base table may be organized as a primary B+tree structure.

When physical row identifiers are used to reference rows in a base table with a primary B+tree structure, they have to be constantly updated due to frequent row movement in the base table. The row movement is caused by the necessity to maintain the sorted nature of the base table. This leads to the use of primary key based logical row identifiers in auxiliary structures. However, logical row identifiers do not have the desirable properties of their physical counterparts such as fixed-length, well-known formats, and the ability to be compressed, among others.

No prior solutions exist that permit use of logical row identifiers while retaining the beneficial properties of physical row identifiers. The present invention provides a solution to the above problems by providing a mapping mechanism for logical row identifiers so that physical row identifiers can be used in a secondary index/auxiliary structure for a primary B+tree in a database management system. The primary B+tree includes a plurality of rows. The secondary index/auxiliary structure includes a plurality of rows, including a row for each row of the primary B+tree.

The present invention provides a mapping table for referencing rows of a primary B+tree. The mapping table includes a row for each row of the primary B+tree. A physical row identifier of each row of the mapping table corresponds to a row of the primary B+tree. A logical row identifier stored in the mapping table includes a primary key column value for each row of the primary B+tree.

Additionally, the present invention proposes augmenting the primary B+tree such that each row in the primary B+tree index also stores the physical row identifier of the corresponding mapping table row. Such an arrangement can permit use of the primary B+tree structure as a primary key index for the mapping table because once the primary B+tree row is located, the corresponding mapping table row can be directly accessed using the mapping table row identifier stored therein.

Also, the present invention provides a method for populating/loading a primary B+tree. The method includes generating a row of a mapping table for each row of the primary B+tree. A logical row identifier for a corresponding row of the primary B+tree is stored in each row of the mapping table. The identifier includes a primary key column value for each row of the primary B+tree, as well as a physical address of the primary B+tree index block, referred to as guess-DBA, where the row is most likely to be found. The physical row identifier of the mapping table row is then used in the secondary index/auxiliary structure.

Still further, the present invention provides a method for maintaining a circular dependency between a mapping table row and a primary B+tree row. The method includes computing a length of a mapping table row based upon a length of a primary key and an overhead of a guess-DBA. The computed length is utilized to identify a mapping table block that can accommodate the row. A slot in the identified mapping table block is reserved. The block address and the reserved slot form a mapping table physical row identifier. A primary B+tree row containing the physical row identifier is inserted into the primary B+tree. A leaf block address of the primary B+tree row, that is, a guess-DBA, is utilized to construct a row of the mapping table. The mapping table row is inserted in the reserved slot.

The present invention also provides a computer program product and a system that can perform the above processes.

Still other objects and advantages of the present invention will become readily apparent by those skilled in the art from a review of the following detailed description. The detailed description shows and describes preferred embodiments of the invention, simply by way of illustration of the best mode contemplated of carrying out the present invention. As will be realized, the invention is capable of other and different embodiments and its several details are capable of modifications in various obvious respects, without departing from the invention. Accordingly, the drawings and description should be considered illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

Figure 1:
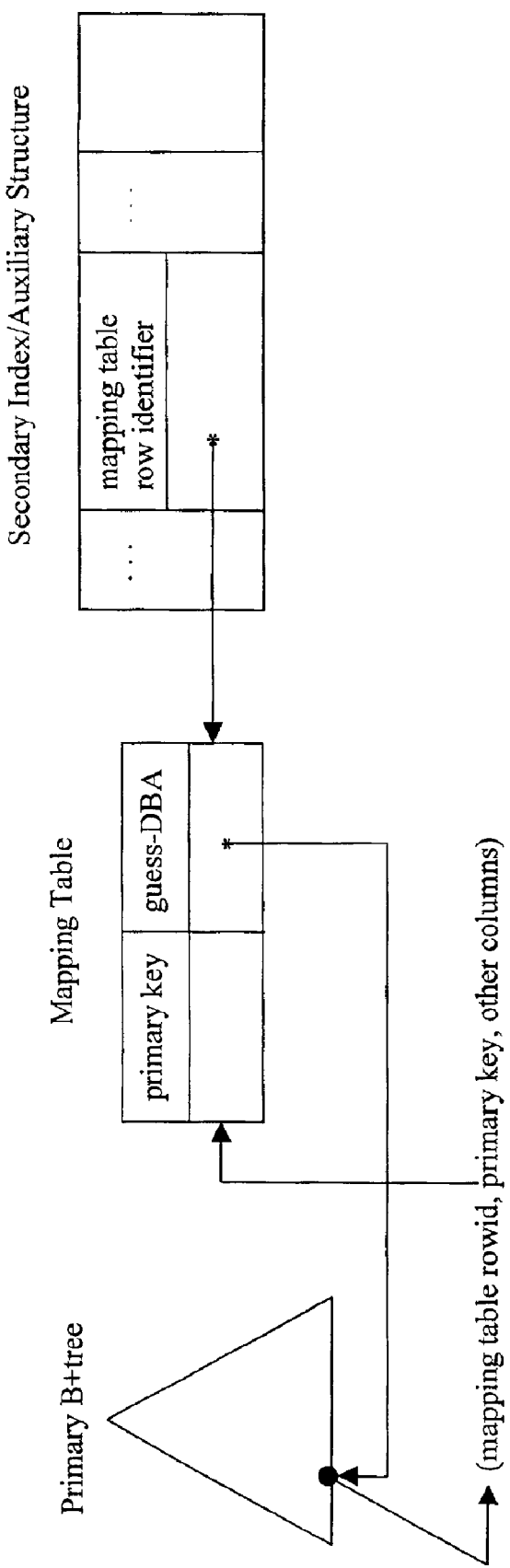
FIG. 1 represents a diagram that illustrates a primary B+tree, mapping table, and an associated auxiliary structure according to an embodiment of the present invention.

A significant number of applications deal with data sets where each individual row is identified by a primary key. The primary key could be a single column such as social security number for an employees table in an HR application, or a multi-column entity such as <warehouse, district, order, order line> for orders table in a product sales and distribution business application. For such applications, if the query workload were dominated by primary-key access, then clustering the rows of the table in the primary key order would be beneficial. In fact, several DBMSs provide a variant of B+trees with row data in leaf node, also referred to as primary B+trees, to speed-up primary key-based access to the table data. A primary B+tree is a variant of a B+tree structure with row data in leaf blocks.

Oracle Corporation has developed a particular type of primary B+tree structure. Index organized tables, or primary B+tree like structures in Oracle, can include indexed columns as well as all remaining columns of a table in a primary B+tree. Each row in an index-organized table can consist of key and non-key columns. The non-key columns may be stored along with the key columns in a B+tree, making the whole table structure have an index-organization. Typically, the entire table data can be held in its primary key index. This organization provides fast random access on the primary key because an index-only scan is sufficient. Once a leaf block is reached, both the key as well as the non-key columns can be retrieved. An index-organized table can provide fast range access on the primary key because the rows are clustered in primary key order and they contain both key and non-key columns. Also, use of an index-organized table avoids duplication of primary key columns as in a heap-organized table with a primary key index.

Distinguishing features of index-organized tables when compared to other primary B+tree implementations include support for a heap-organized overflow storage area that provides supplementary storage for columns. This allows controlling the placement of columns in the index versus overflow storage area and provides the capability for tuning the number of rows that fit in an index leaf. Infrequently accessed non-key columns of the index-organized table can be pushed to the overflow storage area, by specifying the percentage of space reserved for a row in the index block, and/or specifying a column at which a row should be divided into index and overflow portions. This increases the leaf row density, that is, the number of index rows that can fit in a leaf block of the B+tree structure.

Index-organized tables also provide support for secondary indexes with logical primary key-based row identifiers, which include the primary key as well as a database block address (DBA). This DBA, referred to as guess-DBA, is treated as a guess as to where the row may be found in the base table (primary B+tree). A secondary indexbased scan using a valid guess will cost only a single block I/O. However, if the guess is invalid, the primary key is used to find the row. Thus, for valid guess-DBAs, the secondary index performance is comparable to that of secondary index with physical row identifiers. At the same time, the logical nature of secondary indexes enables faster reorganization and increased uptime of the base table since they need not be updated during such a reorganization. Support for online guess-DBA fixing allows regaining the guess-DBA based performance.

Index-organized tables also provide support for compressing common (column) prefixes of the primary key. Since the rows are clustered in the primary key order, there is more likelihood of finding common prefixes.

Index-organized tables are suitable for order processing applications with 24×7availability requirements such as for E-Commerce. Specifically, faster reorganization is achieved due to the logical nature of secondary indexes. Index-based scan performance degradation is avoided through use of guess-DBAs. The guess-DBA based performance may be retained by online fixing of any guess-DBAs invalidated during reorganization. Key-compressed index-organized tables are suitable for Internet applications that may require a hierarchical storage organization, such as portals and electronic storefronts. Internet search engines and text databases can implement the inverted index, the fundamental data structure needed for full-text search, as an index-organized table. The need to handle variable length rows in the inverted index without degrading access to small rows can be satisfied by using index-organized table column placement options. Index-organized tables can also be utilized for fact tables in data warehousing applications.

The present invention addresses problems associated with use of physical row identifiers in referencing a primary B+tree structure. In general, the present invention enables building secondary index or other auxiliary structure for an index-organized table in a database system using physical row identifiers. The secondary index structure includes a plurality of rows, including one row for each row of the index-organized table. Each secondary index row also includes a physical row identifier of the corresponding mapping table row, wherein the physical row identifier corresponds to or identifies a row of the index-organized table.

Along these lines, the present invention particularly provides a mapping mechanism, wherein values present in the mapping table map to locations in the index-organized table. Such embodiments are typically utilized in association with a primary B+tree. In such a context, the mapping table can include one row for each row in the primary B+tree structure, thereby providing a one-to-one mapping of physical row identifiers and primary keys of the B+tree. As such, the present invention allows auxiliary structures to reference rows in a primary B+tree structure via mapping table row identifiers and, thus, provide properties of physical row identifiers wherein the physical row identifiers are less volatile.

By providing a one-to-one mapping between primary keys of the primary B+tree structure and physical row identifiers of the mapping table, even if a row moves in the primary B+tree structure, the corresponding row in the mapping table does not move. Additionally, if an update on the primary B+tree structure causes a primary key to change, the corresponding mapping table row may be updated in-place to contain the new primary key. This can ensure that the mapping table row identifier does not change. Also, row identifiers of the mapping table have the properties of physical row identifiers. Along these lines, the mapping table row identifiers can have a fixed length, have a wellknown format, and may be amenable to compression.

In addition to the primary key value, a mapping table row may also store the database block address (DBA) of the leaf block where the primary B+tree row is likely to be found. The database block address, also referred to as guess-DBA, can facilitate direct lookup from mapping table to primary B+tree structure row. If the row moves due to a split of the leaf block, the corresponding mapping table entry DBAs may not be updated immediately. If the guess-DBA were incorrect, then accessing the primary B+tree row from mapping table row would require primary-key based lookup. This is similar to storing of guess-DBAs in secondary indexes as described in U.S. patent application Ser. No. 09/473,073, to Chong et al., filed Dec. 28, 1999, for "Database System Having Logical Row Identifiers", the entire contents of the disclosure of which is hereby incorporated by reference.

According to embodiments of the present invention, the primary B+tree may be augmented to store a physical row identifier for each mapping table row in the corresponding row of the primary B+tree structure. Such an arrangement can permit use of the primary B+tree structure as a primary key index for the mapping table because once the primary B+tree row is located, the corresponding mapping table row can be directly accessed using the mapping table row identifier stored therein.

Furthermore, according to the present invention, the mapping table row identifier may be stored in the primary B+tree row at a fixed offset as opposed to a variable offset from beginning. This can make it efficient to extract the mapping table row identifier for a given primary B+tree row.

In addition to the above, the present invention may also include storing and using the mapping table row identifier in auxiliary structures, such as B+tree indices, as a reference to the corresponding primary B+tree row. FIG. 1 illustrates such an embodiment. Along these lines, FIG. 1 illustrates a primary B+tree, a mapping table, and an auxiliary structure. This arrangement provides multiple references among the three structures. Although FIG. 1 illustrates a mapping table row that includes both a primary key and a guess-DBA, the mapping table row may contain only the primary key column values of the base table.

The present invention also facilitates creating and updating a primary B+tree and a mapping table. For example, for bottom up load of a primary B+tree with a mapping table, the present invention can utilize a single pass method for maintaining the circular dependency between a mapping table row and a corresponding primary B+tree row. During one embodiment of such a process, when inserting a row into the primary B+tree, the mapping table row length may first be computed from primary key length and by taking into account the overhead for the guess-DBA. The computed length may then be used to identify a mapping table block that can accommodate the row. A slot in that identified mapping table block may be reserved. The reserved mapping table block address and the reserved slot form the mapping table row identifier. Next, the primary B+tree row containing this physical row identifier may be inserted. The leaf block address of the index row may be utilized to construct the mapping table row. Finally, this mapping table row may be inserted at the previously reserved slot.

Figure 2:
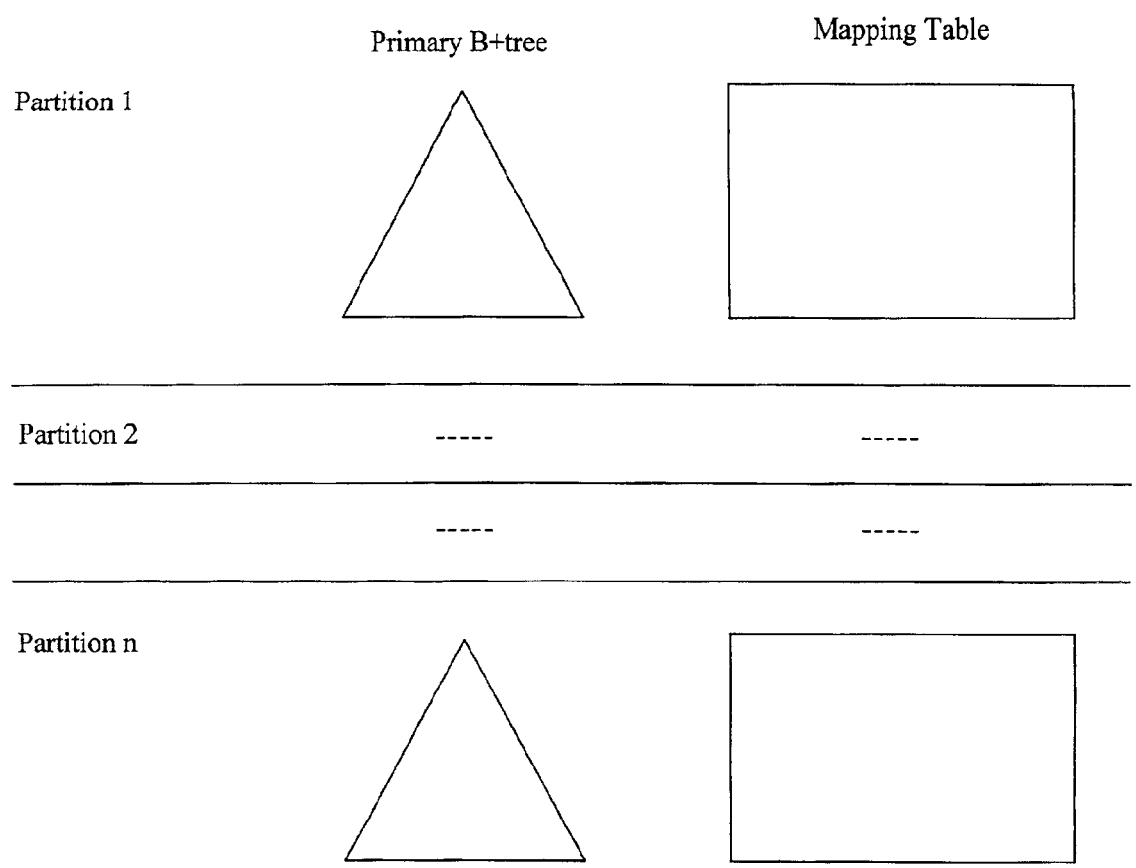
FIG. 2 represents a diagram that illustrates horizontal partitioning of a primary B+tree structure with an equally partitioned mapping table according to an embodiment of the present invention.

According to another embodiment of the present invention the mapping table may be equi-partitioned with respect to a horizontally partitioned primary B+tree like structure. FIG. 2 illustrates such an embodiment.

In addition to providing a method for maintaining circular dependency between the mapping table row and the corresponding primary B+tree, the present invention provides a plurality of methods for maintaining the mapping table when performing partition maintenance operations on a primary B+tree structure. For example, according to one embodiment, the mapping table partition will not be maintained during the partition maintenance operation and will be marked unusable. Subsequently, the mapping table partition and the auxiliary structures that rely on it are rebuilt when needed. This embodiment of the present invention can reduce downtime for the primary B+tree structure. As a result, access methods that rely on the primary B+tree structure alone or other auxiliary structures that do not rely on the mapping table partition will be available sooner.

Another embodiment of the present invention maintains the mapping table as part of the partition maintenance operation itself using the above-described method for maintaining circular dependency between a mapping table and a corresponding primary B+tree row. However, this method can prolong the downtime required for the primary B+tree partition.

Yet another embodiment of the present invention performs the partition maintenance operation and the mapping table maintenance online. This involves maintaining a journal table that records all changes done during the reorganization and applying these changes to the reorganized table. This embodiment makes the partition available throughout the operation. However, this embodiment requires additional storage to store the journal entries and will also have a slight performance degradation for data manipulation operations such as insert, update, and delete, in the duration.

Further aspects of this embodiment include maintaining auxiliary structures as part of the same online operation. That is, the auxiliary structures can also be rebuilt online. Additional storage will be required for this embodiment to maintain temporary copies of all auxiliary objects being rebuilt. The Data Manipulator Language (DML) performance still needs to do only one journal entry, because the same journal entry can be used to update all the objects being rebuilt. This embodiment provides particularly favorable results with respect to availability. However, the DML performance degradation, resulting from the need to maintain journal table, may persist for a longer duration. For example, the degradation may last until completion of online reorganization of the table, mapping table, and auxiliary objects.

Figure 3:
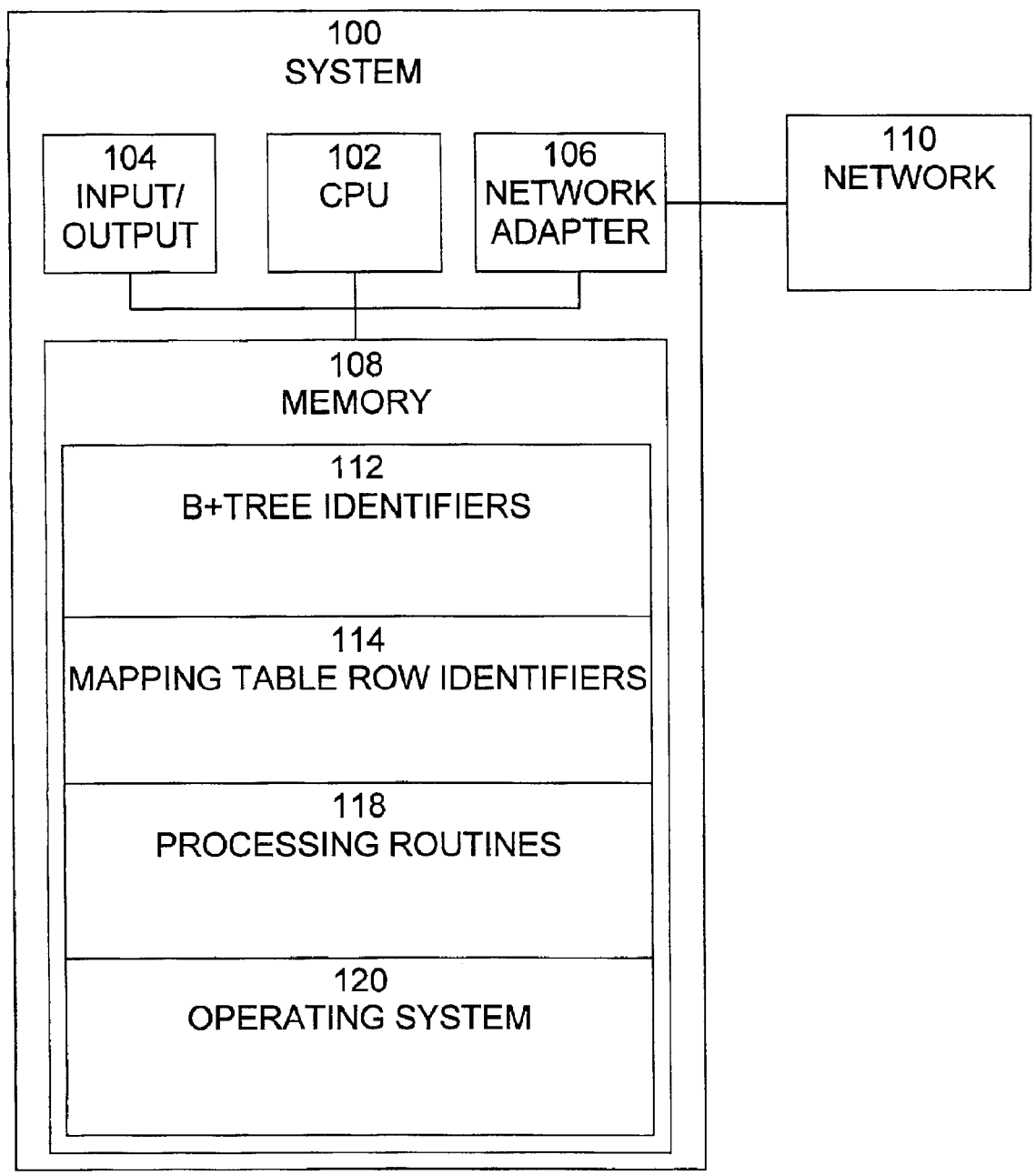
FIG. 3 represents a block diagram that illustrates aspects of a system according to an embodiment of the present invention.

The present invention also includes a computer program product and a system, both of which including computer program instructions or a memory for storing computer program instructions for carrying out any of the methods described herein. For example, FIG. 3 illustrates an exemplary block diagram of a system 100, according to the present invention. The system 100 is typically a programmed general-purpose computer system, such as a personal computer, workstation, server system, and minicomputer or mainframe computer.

The system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor.

Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc.

Network adapter 106 database management system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes a plurality of blocks of data, such as primary B+tree row identifier block 112 and mapping tree row block 114 and a plurality of blocks of program instructions, such as processing routines 118 and operating system 120. B+tree row identifier block 112 stores a plurality of B+tree identifiers, such as primary key values, that have been received by the system 100. Mapping tree row block 114 stores a plurality of values corresponding to the rows in the mapping table. Processing routines 118 are software routines that implement the processing performed by the present invention to carry out the methods described herein. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The present invention provides a structure and method for a problem without a solution. Virtually all methods and algorithms for heap tables utilize the physical row identifying the row location of primary B+tree structure. On the other hand, the present invention permits primary B+tree structures to have the same methods and algorithms as heap tables. Therefore, the present invention provides significant advantage over known solutions that address primary B+tree structures, particularly in applications such as data warehousing and E-commerce, where the B+tree is utilized.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for loading/populating a primary B+tree in a memory of a computer system having an associated mapping table, the method comprising:

generating a row of the mapping table for each row of the primary B+tree; and storing in each row of the mapping table a row identifier for a corresponding row of the primary B+tree, the row identifier comprising a primary key column value for each row of the primary B+tree and a guess-DBA.

2. A method for maintaining a circular dependency between a mapping table row in a memory of a computer system and a primary B+tree row in the memory of the computer system, the method comprising:

computing a length of a mapping table row based upon a length of a primary key and an overhead of a guess-DBA;

utilizing the computed length to identify a mapping table block that can accommodate the row;

reserving a slot in the identified mapping table block, wherein an address of the block and a reserved slot form a mapping table physical row identifier;

inserting a primary B+tree row containing the physical row identifier into the primary B+tree;

utilizing a leaf block address of the primary B+tree row to construct a row of the mapping table; and inserting the mapping table row in the reserved slot.

3. The method according to claim 2, further comprising:

carrying out a partition maintenance operation on the primary B+tree; and rebuilding the mapping table after the partition maintenance.

4. The method according to claim 2, further comprising:

carrying out a partition maintenance operation on the primary B+tree; and maintain the mapping table during the partition maintenance.

5. The method according to claim 2, further comprising:

carrying out a partition maintenance operation on the primary B+tree and rebuilding the mapping table on-line.

6. A computer program product for performing a process for indexing a primary B+tree, the computer program product comprising:

a computer readable medium; and computer program instructions, recorded on the computer readable medium, executable by a processor, for performing the steps of:

generating a row of a mapping table for each row of the primary B+tree; and storing in each row of the mapping table a row identifier for a corresponding row of the primary B+tree, the identifier comprising a primary key column value and a guess-database address for each row of the primary B+tree.

7. A system for performing a process for indexing a primary B+tree, the system comprising:

a processor operable to execute computer program instructions; and a memory operable to store computer program instructions executable by the processor, for performing the steps of:

generating a row of a mapping table for each row of the primary B+tree; and storing in each row of the mapping table a row identifier for a corresponding row of the primary B+tree, the identifier comprising a primary key column value and a guess-database address for each row of the primary B+tree.

8. A method of referencing rows of a primary B+tree in the memory of a computer system, the method comprising:

generating a mapping table in the memory of the computer system, the mapping table having a row for each row of the primary B+tree; and storing in each row of the mapping table a primary key value from the primary B+tree, wherein the mapping table provides one-to-one mapping between primary keys of the primary B+tree structure and physical row identifiers of the mapping table.

9. The method according to claim 8, further comprising:

storing in each row of the mapping table a guess-DBA, database block address of a leaf block of the primary B+tree, where a corresponding primary B+tree row is likely to be found.

10. A method of generating a mapping table in a memory of a computer system, comprising:

generating a row of the mapping table for each row of a primary B+tree; and storing in each row of the primary B+tree a mapping table row identifier, the mapping table row identifier comprising a physical row identifier of a corresponding mapping table row.

11. The method according to claim 10, wherein the mapping table row identifiers are stored at a fixed offset from a beginning of each row of the primary B+tree.

12. The method of claim 11, further comprising generating an auxiliary structure for the primary B+tree in the memory of the computer system, the auxiliary structure comprising row identifiers of corresponding mapping table rows, the row identifiers referring to a primary B+tree row.

13. A method for maintaining a circular dependency between a mapping table row in a memory of a computer system and a primary index row in the memory of the computer system, the method comprising:

computing a length of a mapping table row based upon a length of a primary key and an overhead of a guess-DBA;

utilizing the computed length to identify a mapping table block that can accommodate the row;

reserving a slot in the identified mapping table block, wherein an address of the block and a reserved slot form a mapping table physical row identifier;

inserting a primary index row containing the physical row identifier into the primary index;

utilizing a leaf block address of the primary index row to construct a row of the mapping table; and inserting the mapping table row in the reserved slot.

14. The method according to claim 13, further comprising:

carrying out a partition maintenance operation on the primary index; and rebuilding the mapping table after the partition maintenance.

15. The method according to claim 13, further comprising:

carrying out a partition maintenance operation on the primary index; and maintain the mapping table during the partition maintenance.

16. The method according to claim 13, further comprising:

carrying out a partition maintenance operation on the primary index and rebuilding the mapping table on-line.

* * * * *